United States Patent
Goossens et al.

(10) Patent No.: US 6,356,880 B1
(45) Date of Patent: Mar. 12, 2002

(54) METHODS AND SYSTEMS FOR DYNAMIC COST ALLOCATION THROUGH TASK AUTO ASSIGNMENT

(75) Inventors: Roger J. Goossens, Castro Valley; Alvin Law, Redwood Shores; Mahesh Damodare, Belmont, all of CA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/300,146

(22) Filed: Apr. 27, 1999

(51) Int. Cl.[7] .............................................. G06F 17/60
(52) U.S. Cl. ...................................................... 705/30
(58) Field of Search ............................. 705/30, 32, 11, 705/8

(56) References Cited

U.S. PATENT DOCUMENTS 5,799,286 A * 8/1998 Morgan et al. ................ 705/30
5,970,476 A * 10/1999 Fahey ............................ 705/28

FOREIGN PATENT DOCUMENTS

JP       6-251087     * 9/1994

OTHER PUBLICATIONS

Robert S. Kaplan Et Al, Cost & Effect Using Intergrated Cost Systems To Drive Profitability And Performance, Harvard Business School Press, PP. 92–94, Copy In 2100 EIC, Feb. 1999.*

* cited by examiner

Primary Examiner—F. J. Bartuska
(74) Attorney, Agent, or Firm—Young Law Firm, P.C.

(57) ABSTRACT

Methods, devices and systems for assigning a value associated with a manufacturing or service-related transaction to a task within an organizational logical structure includes a step of retrieving attributes of the transaction, such attributes including, for example, an identification of the item, whether the item was procured, the PO number, the category of the item and/or an identification of the sub-inventory, in the case of a material transaction. A plurality of predefined task assignment rules are then searched for a matching rule that includes respective criteria corresponding to each retrieved attribute. Each of the plurality of task assignment rules includes an identification of a task within the organizational logical structure. The value associated with the transaction may then be assigned to the task identified in the matching rule. The assigned value may include the cost associated with the transaction. By automating the task assignment process, a fine level of cost accounting detail may be achieved without prohibitively affecting data entry of cost-related and other data in large and complex projects.

29 Claims, 4 Drawing Sheets

| Project | Task | Item | Procure | PO Number | Category | Subinventory |
|---|---|---|---|---|---|---|
| P1 | T1 | A |  | 101 |  |  |
| P1 | T2 | A |  |  |  | Stores |
| P1 | T9999M |  |  |  |  |  |

310 — row 1
320 — row 2
330 — row 3

FIG. 3

| Project | Task | Operation Code | Job Number/ Prefix | Assembly | Department Code |
|---|---|---|---|---|---|
| P1 | T145 | Drill1 | R |  |  |
| P1 | T293 | Drill1 |  |  | AS2 |
| P1 | T9999R |  |  |  |  |

410 — row 1
420 — row 2
430 — row 3

METHODS AND SYSTEMS FOR DYNAMIC COST ALLOCATION THROUGH TASK AUTO ASSIGNMENT

BACKGROUND OF THE INVENTION

1. Field of the Invention

This invention relates to the field of computer-implemented cost allocation and accounting systems for projects and undertakings. More particularly, the present invention relates to computer-implemented cost assignment methods and systems that enable a flexible and dynamic assignment of costs to a specific task through a rule-based Task Auto Assignment engine.

2. Description of the Related Art

Modem society is demonstrably increasingly dependent upon highly complex and technologically based objects of manufacture such as factories, airplanes, ocean liners, off-shore oil rigs, launch vehicles and automobiles, for example. Each of these typically requires the manufacture and assembly of many thousands (if not millions) of components. The actual cost of each constituent component may include many other costs, such as the cost of the material used to manufacture the component, the cost of purchasing the component and/or the resource costs associated with the component, among others. The cost(s) of each constituent component must be collected and tracked over the lifetime of the project to provide a realistic assessment of the actual cost of the object manufactured. This assessment is necessary to determine the overall profitability of the project and/or to compare budgeted and actual costs of individual tasks within the project. To track this myriad of costs necessitates a sophisticated information infrastructure.

This sophisticated information infrastructure is typically broken down into a hierarchy of interrelated tasks, each logically associated with a project. In the case of the manufacture a aircraft, for example, a logical tree structure (also sometimes called a Work Breakdown Structure or WBS) might be created to store information relating to each of the individual tasks that must be performed to manufacture and to deliver the finished aircraft to the customer. The organization of such a logical tree structure may be modeled upon the physical structure of the object and/or may be based upon other workflow or accounting considerations.

Figure 1:
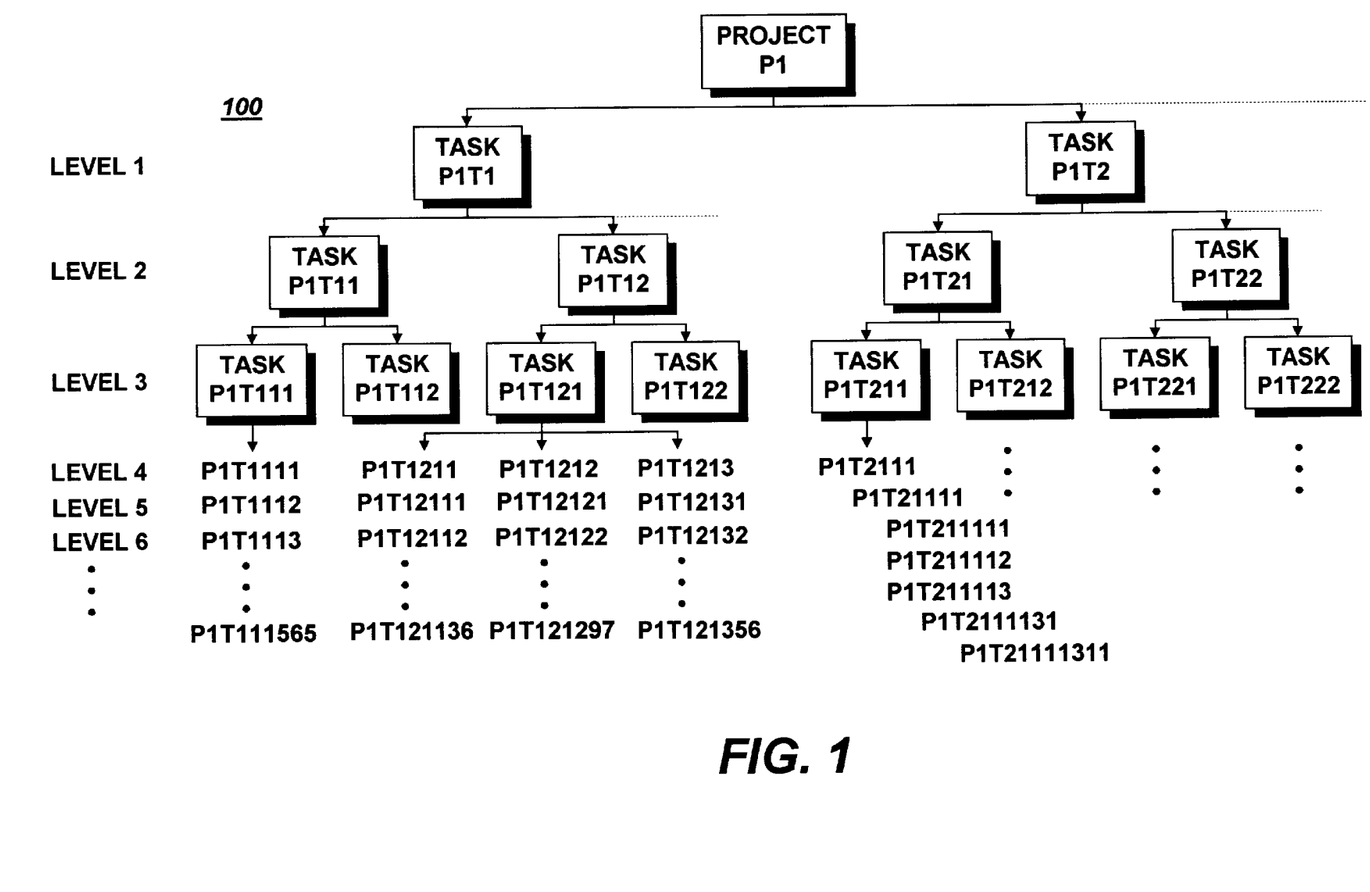
FIG. 1 is a diagram of a work breakdown structure created to track the costs associated with the performance of a large manufacturing project.

FIG. 1 shows an example of a logical tree structure 100 that may be created to track the costs of performing the individual constituent tasks of a manufacturing project, as well as the overall cost of the project itself. The structure 100 is a hierarchical structure including a top-level project P1 and a plurality of tasks hierarchically associated therewith. For example, the project P1 may correspond to the manufacture of an aircraft, or a significant portion thereof. Project P1, as shown in FIG. 1, has a number of tasks associated therewith. These tasks may correspond to the manufacture, assembly or testing of major components of the aircraft, such as the fuselage, the wings, the avionics, etc. For example, task P1T1 in level 1 may correspond to the manufacture, assembly and/or integration of the fuselage, whereas task P1T2 in level 1 may be related to the assembly of the avionics system. Still other tasks, such as the manufacture of the wings or the electrical system are collectively referenced in FIG. 1 by the dashed lines extending from the solid lines of the WBS. In turn, each of the tasks in level 1 may include other tasks associated therewith, located at hierarchically lower levels. For example, task P1T1 may have at least tasks P1T11 and task P1T12 in level 2 associated therewith (in a parent-child relationship, for example). In turn, task P1T11 may be hierarchically associated with level 3 tasks P1T111, P1T112 whereas task P1T12 may be associated with tasks P1T121 and P1T122. Still lower level tasks, in turn, may be associated with each of the aforementioned level 3 tasks. The tasks hierarchically associated with task P1T2 may be similarly organized, as a series of hierarchically cascading tasks, each task potentially being associated with both lower level and higher level tasks, and each task being logically coupled to project P1 through hierarchically higher level tasks.

In the example shown in FIG. 1, each task associated with project P1 corresponds to some undertaking, action, or transaction necessary to complete the manufacture of an aircraft. Each of these undertakings, actions or transactions, therefore, may incur a cost to the manufacturer or to some outside contractor. Each of these costs must be collected and assigned to the proper task within the hierarchical tree structure 100. In this manner, project leaders, task leaders and accountants may determine the actual cost of manufacturing the entire project (an aircraft, for example) or the actual cost of manufacturing any constituent portion thereof. For example, to ascertain the cost of task P1T21 (a portion of the avionics system, for example), all of the costs associated with hierarchically lower-level tasks will be rolled up (aggregated and summed) into task P1T21. That is, the costs assigned to tasks P1T211, P1T2111, P1T21111, P1T211111, P1T211112, P1T211113, P1T2111131, P1T21111311, as well as the costs assigned to task P1T212 (and any lower level tasks associated therewith) will be added to the cost assigned to task P1T21 to yield the actual cost of manufacturing the aircraft sub-assembly associated with task P1T21. Moreover, budgeted costs may also be assigned to each task within the tree 100, and/or to the entire project 100, making actual versus budgeted comparisons possible. These costs, along with other information, may be stored in data structures (such as tables, for example) maintained in a computerized database.

Although of great value to accountants and corporate decision-makers, such a data structure can be highly burdensome to populate and to maintain with the appropriate task-related data. Indeed, the data entry burden associated with the structure shown in FIG. 1 (and similar structures) is significant and can negatively impact the cost of the entire project. For example, should the costs associated with task P1T12121 be inadvertently assigned to task P1T12122, the actual costs later reported for both of these tasks will be in error. Moreover, the time required for manually entering such costing data can be great. Understandably, the risk of erroneous cost assignment generally increases with the number of tasks within the project. When tasks are manually entered, it becomes foreseeable (and even likely) that some costs may inadvertently be assigned to an incorrect task or tasks, as the miskeying or transposition of a single digit in a task number or identifier will change the task to which the cost is assigned. Additionally, to correctly assign a cost to a particular project and task requires a detailed knowledge of the hierarchical tree structure, often an unlikely proposition for personnel assigned to data entry. What are needed, therefore, are methods, devices and systems that alleviate the burden of manually entering and assigning these costs to specific tasks, and that reduce the risk of incorrect cost assignments.

Each of the tasks shown in FIG. 1 may itself be an aggregate cost of several task-specific costs. Indeed, within the cost allocated to each task may be included a number of individual sub-costs relating to, for example, the cost of materials used in performing the task, the resource cost (such as the cost of running a machine tool for example), the cost of packaging the sub-assembly and/or the personnel cost of performing the task. The cost of correctly assigning these sub-costs to specific sub tasks may itself constitute an impermissibly great burden upon the project. Often, therefore, the benefits of such increased granularity in the cost assignment process may be outweighed by the corresponding disadvantages of increased data entry. For this reason, these sub-costs are typically aggregated together within the cost assigned to a task, making it difficult (or impossible) for the accountants to extract, derive or reproduce them later. Therefore, although a task may be running greatly over budget, the true cause of the cost overrun for that task may be identified (if at all) only with difficulty, as the sub-cost causing the overrun may have been subsumed into the overall cost of the task. Additionally, in the case wherein the material cost for a particular task is greater than expected and the cost of another resource for the same task is smaller than expected, the material cost overrun may not be detected or detectable, as these sub-costs may have been aggregated upon assigning the cost to the task.

One potential solution would be to assign each of these sub-costs to a separate task and to logically couple the new tasks within the WBS for that project. However, it may be appreciated that doing so may vastly complicate an already ungainly logical structure and conventionally imposes new and often excessively burdensome demands upon data processing resources and data entry. What are needed, therefore are methods and systems for assigning costs to tasks within a project organizational structure that reduce data entry requirements while maintaining consistent cost assignment results. What are also needed are methods and systems that allow for improved tracking of material and resource costs (among other costs), within and across tasks of a project.

SUMMARY OF THE INVENTION

It is an object of the present invention, therefore, to provide methods, devices and systems that alleviate the burden of manually entering and assigning costs and other values to specific tasks, and that reduce the risk of incorrect assignments. It is a further object of the invention to provide methods, devices and systems to assign values to specific tasks (or other functional entities) within a logical structure in an automatic and consistent manner. A still further object of the present invention is to provide methods, devices and systems that allow for improved tracking of material and resource costs (among other transaction-related values and/or user-definable transaction-related elements), within and across tasks of a project.

In accordance with the above-described objects and those that will be mentioned and will become apparent below, a computer implemented method of assigning a value associated with a manufacturing or service-related project-based transaction to one of a plurality of tasks within an organizational logical structure, includes steps of retrieving at least one attribute of the transaction. Such attribute(s), in the case of a resource-related transaction, may include an identification of the operation code, the job number and/or job prefix, an identification of the assembly and/or and identification of the relevant department code, for example. A plurality of predefined task assignment rules may then be searched for a matching rule that includes respective criteria corresponding to each retrieved attribute. Each of the plurality of task assignment rules includes an identification of a task within the organizational logical structure. The value associated with the transaction may then be assigned to the task identified in the matching rule.

According to an embodiment of the present invention, the value may include a cost associated with the transaction.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

FUNCTIONAL OVERVIEW

The present invention implements a rule-based approach to the assignment of transaction-related values (such as costs, for example) to specific task(s) in a WBS or other organizational structure. Within the context of the present invention, the term transaction shall be deemed to include any activity that incurs a cost within a project. For example, manufacturing transaction costs may include costs associated with inventory (including issue, receipt and/or transfers, for example), material, overhead, procurement costs and/or the cost of outside processing, for example. Similarly, resource transaction costs may include engineering and/or production labor, as well as the cost of running machinery (including rate and overhead), for example.

Figure 2:
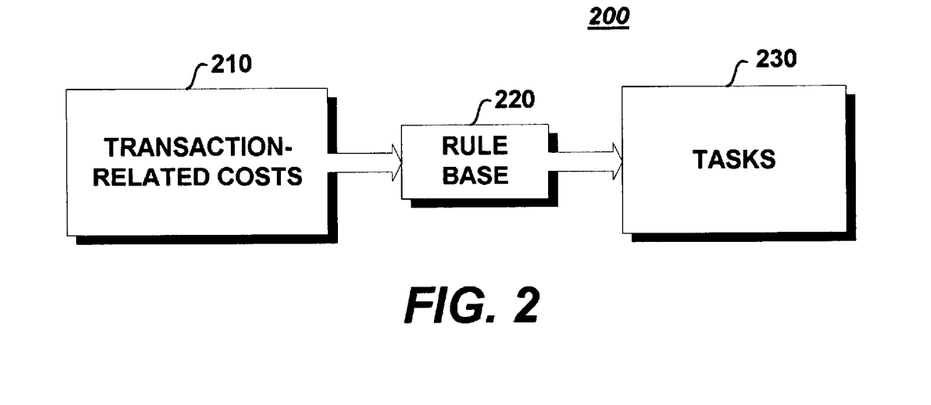
FIG. 2 is a conceptual block diagram of an embodiment of the present invention.

FIG. 2 represents a conceptual diagram of an embodiment of the present invention. As shown therein, the method and system 200 according to the present invention may be illustrated as a collection of transaction-related costs 210 that are fed through a rule base 220. Based upon the nature of each transaction, a selected task assignment rule within the rule base 220 is applied to assign each of the transaction-related costs 210 to a selected task 230 within the WBS or other organizational structure. The rule base 220 automates the assignment of transaction-related costs (or other transaction-related values) to specific tasks, and may virtually eliminate data entry errors that lead to incorrect cost-to-tasks assignments. This automation also greatly reduces the data entry requirements and allows those without a detailed knowledge of the WBS or other relevant organizational workflow structure to readily assign values such as costs to the proper task or tasks in a correct and consistent manner.

The rule base 220, according to an embodiment of the present invention, includes a plurality of task assignment rules and may further include at least one task assignment rule for each type or class (e.g., material-related, resource-related, etc.) of transaction. As the assignment of transaction-related costs to a specific task, according to the present invention, no longer requires a manual entry of the task number, it is preferred that one or more task assignment rules exist for each type or class of transactions, to insure that the cost or costs related to every transaction of a project may be properly assigned to a selected task within the project's WBS or other organizational structure. It is, therefore, preferred to completely specify and define the task assignment rules within the rule base 220 to cover the entire realm of costs to tasks assignments. However, the present invention provides for the case wherein none of the task assignment rules defined in the rule base 220 applies to a particular transaction, which would otherwise result in a failure to properly assign the cost(s) to a particular task. In such as case, the cost(s) related to the transaction should be assigned to a selected default task. In this manner, each transaction-related cost may be matched to at least one task.

Figure 3:
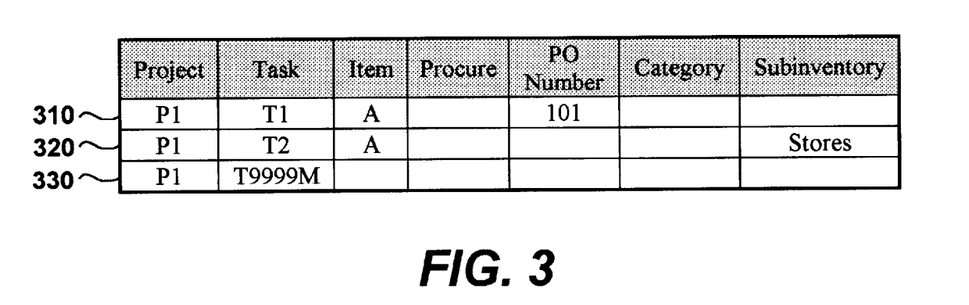
FIG. 3 shows examples of task assignment rules that may be included in the rule base 220 of FIG. 2.

The task assignment rules included in the rule base 220 do not require the task number to be specified on the transaction. Rather, the task assignment rules of the rule base 220 operate on a plurality of criteria which, when evaluated collectively, identify a task within the WBS or other organizational workflow structure to which the costs associated with a particular transaction are to be assigned. Each of the criteria may include a link to one or more tables in a computerized database, such as a relational database. FIG. 3 shows examples of task assignment rules for materials-based transactions, according to an embodiment of the present invention. As shown therein, the task assignment rules may include a plurality of criteria to which the rules apply, five such criteria being shown in the illustrative example of FIG. 3. The criteria for material-based rules may include, for example, an identification of the item generating the cost (Item), whether the item was purchased (Procure), the purchase order number (PO Number), the category of the item associated with the cost to be assigned to a task or tasks (Category) and an identification of the subinventory of the item (Subinventory). Alternatively, the task assignment rules may include a greater or lesser number of criteria, which may be different than those illustrated in FIG. 3. As shown in exemplary task assignment rule 310, if the item whose cost is to be assigned is item A and the purchase order number is 101, then the cost associated with this item is to be assigned to Project 1, Task T1. Similarly, as shown in the exemplary task assignment rule 320, if the item whose cost is to be assigned is item A and the subinventory is identified as "Stores", for example, then the cost (or costs) associated with item A is to be assigned to Project 1, Task 2.

According to the present invention, therefore, it is not necessary to manually enter a lengthy string of numbers and/or characters to uniquely identify a particular task in a WBS or other similar workflow structure. Indeed, to assign a transaction-related cost to a particular task, according to an embodiment of the present invention, the transaction attributes (A and 101 in the example given above relative to task assignment rule 310) are retrieved from appropriate table(s) in a database and the retrieved combination of attributes compared with the Task Auto Assignment rules of the rule base 220. Indeed, the Task Auto Assignment engine searches the plurality of task assignment rules of the rule base 220 for a matching rule that includes respective criteria corresponding to the retrieved attributes of the transaction. As each of the plurality of task assignment rules includes an identification of a task within the WBS, the cost associated with the transaction may then be assigned to the task identified in the matching rule. Not all criteria of the Task Auto Assignment rules need be matched. According to exemplary rule 310, for example, only the Item and the PO Number criteria need be matched with the transaction attributes for the Task Auto Assignment engine according to the present invention to assign the cost for item A procured against PO 101 to Project P1, Task T1. Likewise, according to exemplary rule 320, only the attributes associated with the Item and Subinventory criteria need be matched for the Task Auto Assignment engine according to the present invention to assign the cost for Item A transacted to destination sub-inventory "Stores" to Project P1, Task T2. Other combinations of criteria will uniquely identify other tasks. Although only a limited number of rules 310, 320 and 330 are shown in FIG. 3 for brevity of illustration, it is to be understood that the present invention is not to be limited thereto. Indeed, it is preferable that the task assignment rules (of which rules 310, 320 are but two examples) provide coverage of the entire spectrum of material-related transactions likely to occur in the project at hand. Failure to define task assignment rules for all conceivable materials may result in some transactions not being assigned to a task and the cost for such transactions may not be transferred to the project. Hence, it is preferred that the costs associated with each transaction be assigned to a task. It is preferable, therefore, that a default material-related task assignment rule be provided, such as shown at 330 in FIG. 3. Default task assignment rule 330 is a rule in which all criteria are null. In such a default task assignment rule, the Project and Task fields specify an identifier of the project and task to receive the costs associated with all material-based transactions not covered by the other material task assignment rules. Therefore, as shown in FIG. 3, should none of the task assignment rules match the particular combination of retrieved attributes, the costs associated with the unassigned task will be assigned to default materials task T9999M (or to some other task designated to received unassigned material costs). As most costs within a given session are usually assigned to tasks within a same project, the "Project" designation in the task assignment rules 310, 320 and 330 may be omitted.

Figure 4:
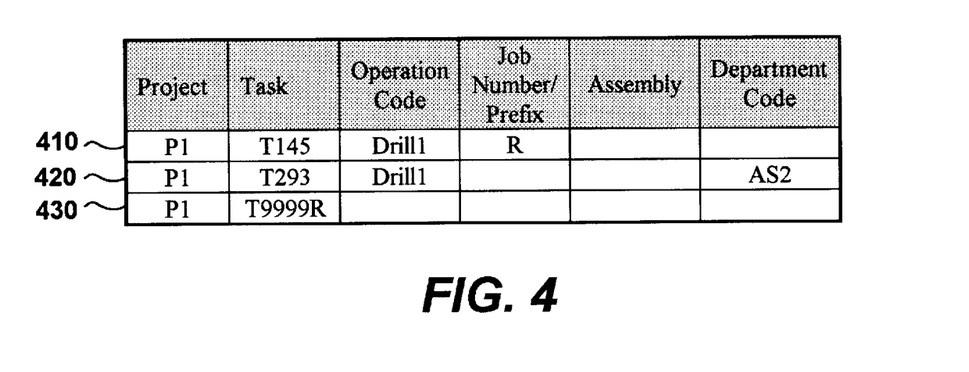
FIG. 4 shows further examples of task assignment rules that may be included in the rule base 220 of FIG. 2.

FIG. 4 illustrates examples of resource-related task assignment rules for assignment of resource-related costs to specific tasks within a WBS or other organizational structure. As shown therein, the task assignment rules for resource-related transactions may include a plurality of criteria to which the task assignment rules apply, four such criteria being shown in the illustrative example of FIG. 4. The criteria for resource-based rules may include, for example, an identification of the operation code for the resource utilized (Operation Code), the job number or the job prefix (Job Number/Prefix), an identification of the assembly associated with this resource-related transaction (Assembly) and an identification of the departmental code (Department Code) associated with this resource. Other criteria may be defined, the criteria illustrated in FIG. 4 being of an exemplary nature only. To assign a resource-related cost to a particular task, according to an embodiment of the present invention, the characteristic attributes for the transaction are retrieved from an appropriate table or tables of a database, for example. These attributes may include an identification of the operation code, the job number and/or job prefix, an identification of the assembly and/or and identification of the relevant department code, for example, of the transaction. Alternatively, the transaction attributes may be entered manually. Thereafter, the plurality of task assignment rules of the rule base 220 are searched for a matching rule that includes respective criteria corresponding to the retrieved attributes. As each of the plurality of task assignment rules includes an identification of a task within the WBS, the cost associated with the transaction may then be assigned to the task identified in the matching rule. For example, as shown in rule 410, if the attributes of this transaction include operation code Drill 1 and job prefix R, then the costs associated with the transactions matching these criteria will be assigned to Project P1, Task T145. Similarly, if the resource-related transaction has an operation code of Drill 1 and a departmental code of AS2, then the Task Auto Assignment engine according to the present invention assigns the costs associated therewith to Project P1, Task T293. The costs associated with both resource-related and material-related transactions (as well as any other type(s) of project transactions) may be assigned to a same task. For example, both task assignment rules 310 and 410 may assign costs to Task T1.

According to rule 410, for example, only the Operation Code and the Job Number/Prefix criteria need be matched with the transaction attributes Drill 1 and R for the Task Auto Assignment engine according to the present invention to assign the cost for that resource-related transaction to Project P1, Task T145. Likewise, according to task assignment rule 420, only the Operation Code criteria and the Department Code criteria need be matched with the transaction attributes Drill 1 and AS2 for the Task Auto Assignment engine according to the present invention to assign the cost for the resource-related transaction to Project P1, Task T293. Other combinations of criteria will uniquely identify other tasks. Although only a limited number of rules 410, 420 and 430 are shown in FIG. 4 for brevity of illustration, it is to be understood that the present invention is not to be limited thereto. Indeed, it is preferable that the task assignment rules (of which rules 410 and 420 are but two examples) provide coverage for all of the resource-related transactions that are likely to occur in the project at hand. A default resource-related task assignment rule is preferably provided, such as shown at 430 in FIG. 4. Default task assignment rule 430 is a rule in which all criteria are null, wherein the Project and Task fields specify the Project/Task to receive the costs associated with all resource-based transactions not covered by the other resource task assignment rules. Therefore, as shown in FIG. 4, should none of the task assignment rules match the particular combination of retrieved transaction attributes, the costs associated with the unassigned task will be assigned to, for example, default resource task T9999R (or to some other task designated to received unassigned resource costs).

Figure 6:
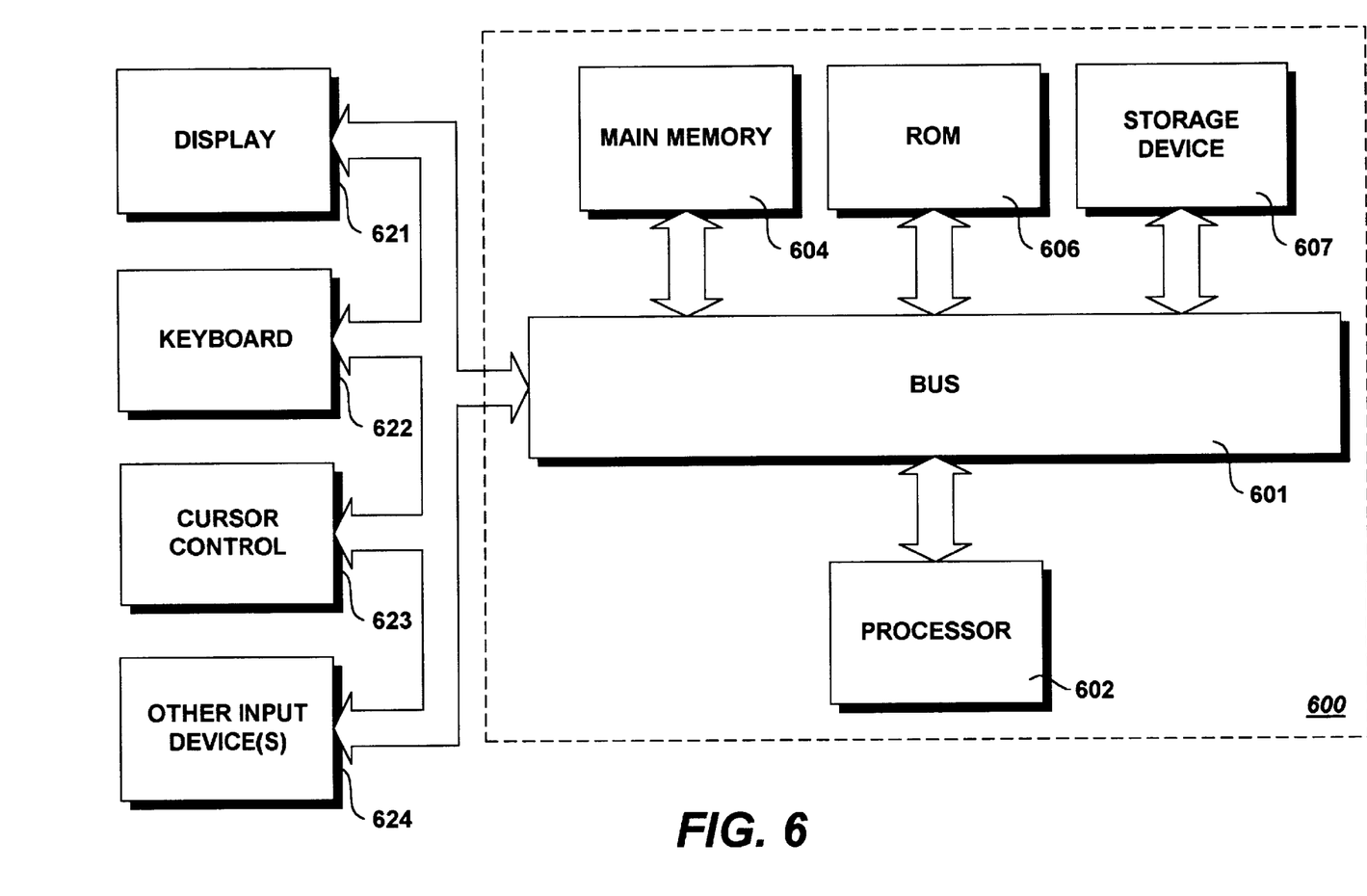
FIG. 6 illustrates a block diagram of a computer with which an embodiment of the present invention may be implemented.

According to the present invention, the attributes for a given transaction, whether material or resource-related, are entered (either manually or automatically by accessing tables within a database) into a suitable computer system (an example of which is shown in FIG. 6) adapted to track the costs of the project at hand, whereupon a task assignment rule is found within the rule base 220 that includes criteria that match the particular combination of retrieved attributes. Upon finding a match, the cost or costs associated with that transaction are assigned to the task specified by the matching rule. Should no task assignment rule within the rule base 220 match the particular combination of retrieved transaction attributes or should all of the criteria fields be null, the Task Auto Assignment engine according to the present invention may assign the transaction to a default task.

A hierarchy of criteria may be established to force the assignment of costs to a specific task before assignment of costs to another task. If, for a material transaction, item A (FIG. 3) is procured against PO number 101 into sub-inventory Stores, although both task assignment rules 310 and 320 contain matching criteria, the Task Auto Assignment engine may assign the costs associated with the material-related transaction to task T1 rather than task T2, because the PO number criteria has been assigned a higher priority than the Subinventory criteria. Likewise, as shown in FIG. 4, although both task assignment rules 410 and 420 may match a given resource-related transaction, the Task Auto Assignment engine according to the present invention may assign the cost associated with the resource-related transaction at hand to task T145 rather than task T293, because the Job Number/Prefix criteria has been assigned a higher priority than the Department Code criteria. Higher priority criteria may occupy a logically different position than lower priority criteria. In the graphical representation of the task assignment rules shown in FIGS. 3 and 4, for instance, higher priority criteria are located to the left of lower priority criteria. The priority of each of the criteria within the rule base 220 may be freely selectable, providing added flexibility to the task assignment process.

To further promote efficient task assignments, the relative sequencing of the task assignment rule criteria within the rule base 220 may be freely selectable. As the number of task assignment rules for material-related, resource-related and other types of transactions may be potentially large, the processing time necessary to match the retrieved transaction attributes with a corresponding task assignment rule may be significant. The present invention, therefore, provides for a flexible sequencing of the task assignment rule criteria. Implementing a flexible sequencing of task assignment rule criteria in combination with a prioritization of the task assignment rule criteria further promotes the efficiency of the task assignment process. For example, the Task Auto Assignment engine, according to an embodiment of the present invention, may search for a rule applicable to Item "A" and Category "Precious Metal". If the criteria are prioritized such that the Item criteria appears before, for example, the Category criteria, it may be possible to eliminate a great many task assignment rules from contention, thereby reducing the total number of remaining task assignment rules to evaluate against the retrieved combination of transaction-related attributes. Moreover, if the remaining task assignment criteria are sequenced such that the more specific task assignment criteria appear before the less specific (or more general) ones, the efficiency of the task assignment process will be higher. Moreover, the criteria may be sequenced such that more general criteria appear before more specific criteria, at the user's option. Other statistical task assignment rule optimization schemes may be implemented in place of or in combination with such a criteria ordering scheme.

To allow the present invention to be tailored to the specific needs of specific industries, the invention provides for user-definable rule criteria, to be used in the definition of task assignment rules of the rule base 220. The provision of user-definable criteria allows users to create unique task auto assignment rules customized to their particular business model. For example, a user may wish to determine whether the morning assembly crew is more productive than the afternoon assembly crew. In this case, a first task may be defined to receive the costs associated with all morning assembly jobs (for a particular item, for example) and a second task may be defined to receive the costs associated with all afternoon assembly jobs. An AM/PM criteria may then be defined and a new rule may be defined to assign the costs associated with the morning assembly jobs to the first task and a second rule may be defined to assign the costs associated with the afternoon assembly jobs to the second task. In this manner, a flexible, expandable and highly customizable rule base 220 may be developed to suit the needs of any particular industry, project or user.

According to still further embodiments, the present invention provides for the ability to import relevant task assignment rules from one project to another project. For example, a large aircraft manufacturer may define the assembly of each aircraft as a separate project. In this case, the ability to copy the task assignment rules from one project to another project saves both the time and expense of re-entering task assignment rules for a project that may be virtually identical to another project in which the task assignment rules have previously been defined. Additional time-sensitive functionality may also be incorporated into the task assignment rules. For example, task assignment rules may be defined as active during a selected time period or periods and inactive outside of the selected time period(s). Similarly, task assignment rules may be flushed out or purged from the rule base 220 after a selected time period, such as upon occurrence of a selected event (the conclusion of a project, for example). Reporting functionality may be incorporated into the rule base 220 to provide a log or an audit trail to track changes to the task assignment rules. In this manner, the time and date of the change(s) to the task assignment rules may be recorded, as well as an identifier of the person having made the change(s).

Figure 5:
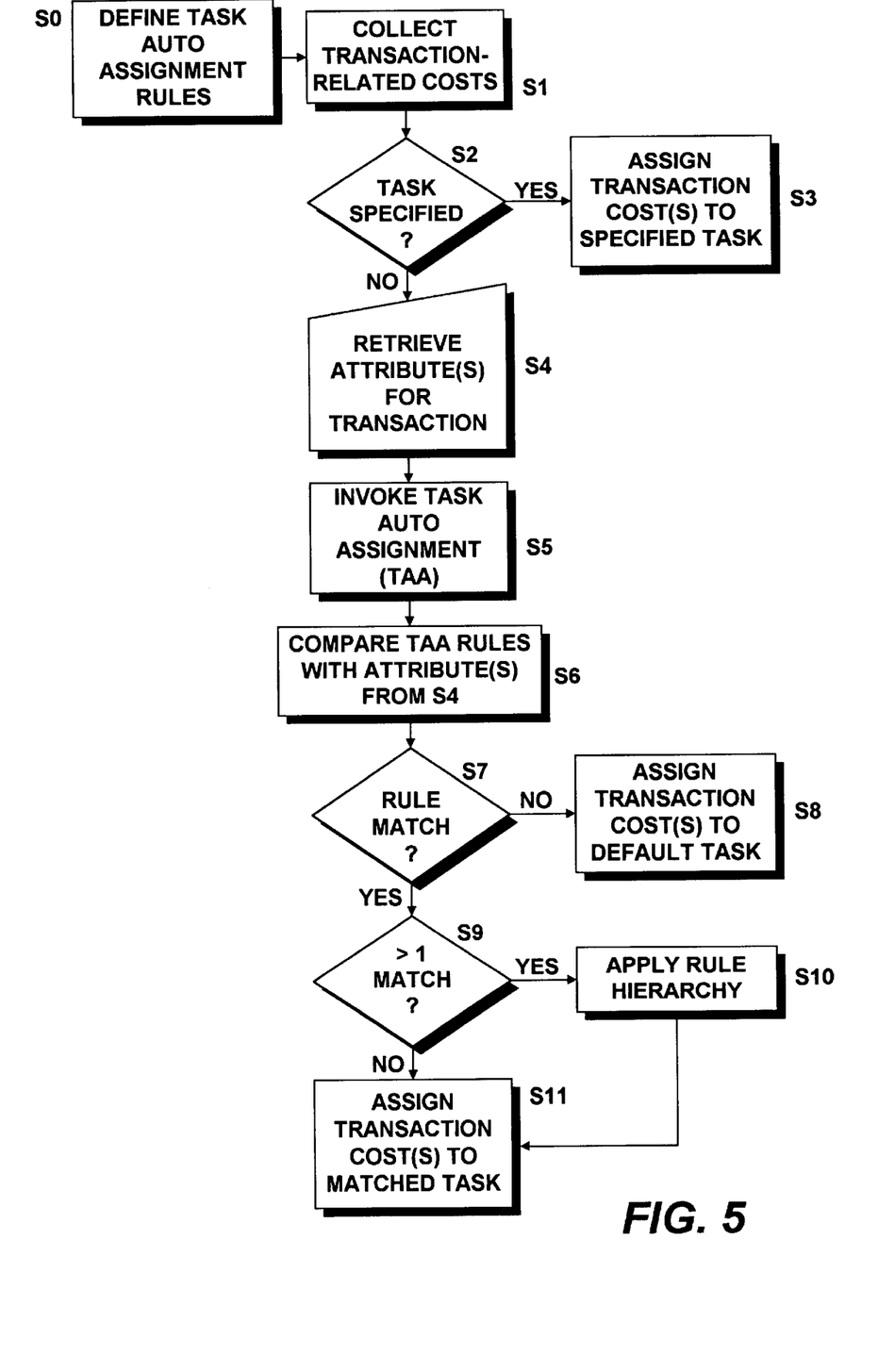
FIG. 5 is a flow chart of an embodiment of the method of assigning transaction-related costs to specific tasks within a WBS or other functionally similar logical structure, according to an embodiment of the present invention.

FIG. 5 is a flowchart of an embodiment of a method of assigning transaction-related costs to specific tasks within a WBS or other functionally similar logical structure, according to an embodiment of the present invention. The structure of the WBS may be modeled upon the hierarchical structures disclosed in commonly assigned U.S. patent application Ser. No. 09/234,964 entitled "Generic Hierarchical Structure With Hard-Pegging Of Nodes With Dependencies Implemented In a Relational Database", filed on Jan. 21, 1999, the disclosure of which is incorporated herewith in its entirety. As shown in FIG. 5, step S0 of the present invention includes a step of defining the Task Auto Assignment rules of the rule base 220, as shown in FIGS. 3 and 4, for example. Step S1 includes the collection of transaction-related costs by accessing, for example, one or more tables in a computerized database. One particularly advantageous method of collecting costs is disclosed in commonly assigned U.S. patent application Ser. No. 09/235,120 filed on Jan. 21, 1999 and entitled "Methods And Systems Enabling The Identification Of Actual Costs In A Transaction Based Financial And Manufacturing Environment", the disclosure of which is also incorporated herewith in its entirety. Alternatively, the collection of costs may be carried out manually. As shown in step S2, if the task number is entered directly, the Task Auto Assignment engine according to the present invention may be bypassed (i.e., may not be invoked) and the cost(s) related to the current transaction may be assigned to the task specified, as shown in step S3. As shown in step S4, if the specific task to which the transaction-related cost(s) are to be assigned has not been specified in step S2, one or more attributes of the transaction may be retrieved from appropriate table(s) in a database. Alternatively, the transaction attributes may be entered manually. Prior to, subsequent to or concurrently with step S4, the Task Auto Assignment engine may be invoked as shown in step S5 and the task assignment rules of the rule base 220 may be compared with the attributes retrieved in step S4, as shown in step S6. If it is determined in step S7, after searching all of the relevant rules (i.e., the material or resource-related task assignment rules of rule base 220, for example), that none of the task assignment rules match the particular combination of transaction attributes retrieved in step S4, then the costs associated with the current transaction may be assigned to a default task, as shown in step S8 and described relative to FIGS. 3 and 4. If, however, a task assignment rule is found that matches the combination of attributes retrieved in step S4, then it is determined, in step S9, whether more than one matching task assignment has been found. If so, the rule having the matched criteria having the highest priority may be selected as the rule governing the assignment of the cost(s) of the current transaction to a task or tasks, as noted in step S10. If only a single cost assignment rule is found that matches the particular combination of transaction-related attributes retrieved in step S4, the cost(s) associated with the transaction is assigned to the project and task specified by the matched rule, as outlined in step S11. The method according to the present invention may then revert back to step S1, for example, to assign further transaction-related costs to tasks within the WBS. Values other than costs may also be assigned to specific task(s) in a similar manner.

By automating the assignment of transaction-related costs to specific tasks, the present invention allows decision-makers, accountants and other interested persons to achieve a significant granularity and flexibility in the cost accounting and reporting without the data entry disadvantages conventionally associated with manual assignment of costs to specific tasks within a project. Indeed, the present invention allows for a far more complex (i.e., detailed) WBS to be implemented than would be the case if conventional data entry methods were employed. In turn, this allows for a far greater granularity in the cost analysis per task or across tasks in a given project than is conventionally possible or practicable. For example, the Task Auto Assignment according to the present invention may be advantageously used to track critical items, such as high value items or items having a long lead-time. For example, the cost of a particular material such as a precious metal may be tracked within a given project by appropriately defining task assignment rules for that material. For example, the cost of that material may be assigned to the task that used or procured the precious metal by a first task assignment rule. Additionally, however, the cost of the precious metal in other tasks may also be assigned to a cost collection task for that precious metal, thereby tracking the costs associated with the precious metal differently within the project. To do this, a second task assignment rule different from the first task assignment rule may be defined that collects all costs for the specified criteria for that material across all tasks within the project. This multiple assignment of costs to separate tasks may be carried out without repeatedly entering task numbers, as in conventional systems, or without repeatedly entering task assignment rule criteria.

Hardware Overview

FIG. 6 illustrates a block diagram of a computer 600 with which an embodiment of the present invention may be implemented. Computer system 600 includes a bus 601 or other communication mechanism for communicating information, and a processor 602 coupled with bus 601 for processing information. Computer system 600 further comprises a random access memory (RAM) or other dynamic storage device 604 (referred to as main memory), coupled to bus 601 for storing information and instructions to be executed by processor 602. Main memory 604 also may be used for storing temporary variables or other intermediate information during execution of instructions by processor 602. Computer system 600 also includes a read only memory (ROM and/or other static storage device 606 coupled to bus 601 for storing static information and instructions for processor 602. A data storage device 607, such as a magnetic disk or optical disk, is coupled to bus 601 for storing information and instructions.

Computer system 600 may also be coupled via bus 601 to a display device 621, such as a cathode ray tube (CRT), for displaying information to a computer user. An alphanumeric input device 622, including alphanumeric and other keys, is typically coupled to bus 601 for communicating information and command selections to processor 602. Another type of user input device is cursor control 623, such as a mouse, a trackball, or cursor direction keys for communicating direction information and command selections to processor 602 and for controlling cursor movement on display 621. This input device typically has two degrees of freedom in two axes, a first axis (e.g., x) and a second axis (e.g., y), which allows the device to specify positions in a plane. Alternately, a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 622 wherein all interface is provided via the stylus as a writing instrument (like a pen) and the written text is interpreted using optical character recognition (OCR) techniques.

The present invention is related to the use of computer system 600 to provide methods and systems for assigning a value associated with a manufacturing or service-related transaction to a task within an organizational logical structure, such as a WBS. According to one embodiment, the methods according to the present invention are implemented by one or more computer systems 600 in response to processor(s) 602 executing sequences of instructions contained in memory 604. Such instructions may be read into memory 604 from another computer-readable medium, such as data storage device 607. Execution of the sequences of instructions contained in memory 604 causes processor(s) 602 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. For example, values other than transaction-related costs may be assigned to specific tasks by invoking the task assignment rules of the rule base 220. Such values may include information related to human resources, time or any other quantity that must be assigned to a specific task or tasks. Those of skill in this art will recognize other alternative embodiments and all such embodiments are deemed to fall within the scope of the present invention. Thus, the present invention should be limited only by the claims as set forth below.

What is claimed is:

1. A computer implemented method of assigning a value associated with a manufacturing or service-related transaction to one of a plurality of tasks within an organizational logical structure, comprising the steps of:

retrieving at least one attribute of said transaction;

searching a plurality of task assignment rules for a matching rule that includes respective criteria corresponding to each retrieved attribute, each of the plurality of task assignment rules including an identification of a task within the organizational logical structure, at least one of the plurality of task assignment rules being one of active only during a selected time period and purged after a predefined time period; and assigning the value associated with the transaction to the task identified in the matching rule.

2. The computer implemented method of claim 1, wherein the value includes a cost associated with the transaction.

3. The computer implemented method of claim 1, wherein said plurality of task assignment rules includes a default task assignment rule, said default task assignment rule including an identification of a default task to which the value is assigned when no matching rule is found in the searching step.

4. The computer implemented method of claim 1, further including a step of optimizing a sequence of the criteria of the plurality of task assignment rules.

5. The computer implemented method of claim 4, wherein the optimizing step orders the criteria of each of the plurality of task assignment rules in such a manner that more specific criteria appear one of before and after more general criteria.

6. The computer implemented method of claim 1, further comprising the step of prioritizing the criteria of each of the plurality of task assignment rules, higher priority criteria triggering a task assignment rule match before lower priority criteria when the searching step finds more than one matching rule.

7. The computer implemented method of claim 1, wherein the retrieving step includes a step of accessing at least one table within a computerized database.

8. The computer implemented method of claim 1, further including a step of customizing the plurality of task assignment rules to a particular field or project.

9. The computer implemented method of claim 8, wherein the criteria are customizable to a particular field or project.

10. The computer implemented method of claim 1, further including a step of generating an audit trail of any changes made to the plurality of task assignment rules.

11. A machine-readable medium having data stored thereon representing sequences of instructions which, when executed by a computer, causes said computer to implement a method of assigning a value associated with a manufacturing or service-related transaction to one of a plurality of tasks within an organizational logical structure, comprising the steps of:

retrieving at least one attribute of said transaction;

searching a plurality of task assignment rules for a matching rule that includes respective criteria corresponding to each retrieved attribute, each of the plurality of task assignment rules including an identification of a task within the organizational logical structure, at least one of the plurality of task assignment rules being one of active only during a selected time period and purged after a predefined time period; and assigning the value associated with the transaction to the task identified in the matching rule.

12. The machine-readable medium of claim 11, wherein the value includes a cost associated with the transaction.

13. The machine-readable medium of claim 11, wherein said plurality of task assignment rules includes a default task assignment rule, said default task assignment rule including an identification of a default task to which the value is assigned when no matching rule is found in the searching step.

14. The machine-readable medium of claim 11, wherein a sequence of the criteria of the plurality of task assignment rules is optimized.

15. The machine-readable medium of claim 14, wherein the optimized sequence of said criteria of said plurality of task assignment rules causes said computer to compare more specific criteria one of before and after comparing more general criteria.

16. The machine-readable medium of claim 11, wherein the criteria of each of the plurality of task assignment rules are prioritized, higher priority criteria triggering a task assignment rule match before lower priority criteria when the searching step finds more than one matching rule.

17. The machine-readable medium of claim 11, wherein the retrieving step includes a step of accessing at least one table within a computerized database.

18. The machine-readable medium of claim 11, wherein the plurality of task assignment rules are customized to a particular field or project.

19. The machine-readable medium of claim 11, wherein said computer further carries out a step of generating an audit trail of any changes made to the plurality of task assignment rules.

20. A computer system to assign a value associated with a manufacturing or service-related transaction to one of a plurality of tasks within an organizational logical structure, said computer system comprising:

at least one processor;

at least one data storage device;

a plurality of processes spawned by said at least one processor, the processes including processing logic for:
  retrieving at least one attribute of said transaction;
  searching a plurality of task assignment rules for a matching rule that includes respective criteria corresponding to each retrieved attribute, each of the plurality of task assignment rules including an identification of a task within the organizational logical structure, at least one of the plurality of task assignment rules being one of active only during a selected time period and purged after a predefined time period; and
  assigning the value associated with the transaction to the task identified in the matching rule.

21. The computer system of claim 20, wherein the value includes a cost associated with the transaction.

22. The computer system of claim 20, wherein said plurality of task assignment rules includes a default task assignment rule, said default task assignment rule including an identification of a default task to which the value is assigned when no matching rule is found.

23. The computer system of claim 20, further including processing logic for optimizing a sequence of the criteria of the plurality of task assignment rules.

24. The computer system of claim 23, wherein the processing logic for optimizing the sequence orders the criteria of each of the plurality of task assignment rules in such a manner that more specific criteria appear one of before and after more general criteria.

25. The computer system of claim 20, further including processing logic for prioritizing the criteria of the task assignment rules, higher priority criteria triggering a task assignment rule match before lower priority criteria when the searching step finds more than one matching rule.

26. The computer system of claim 20, wherein the retrieving step includes a step of accessing at least one table within a computerized database.

27. The computer system of claim 20, wherein the plurality of task assignment rules are customizable to a particular field or project.

28. The computer system of claim 27, wherein the criteria are customizable to a particular field or project.

29. The computer system of claim 20, further including processing logic for generating an audit trail of any changes made to the plurality of task assignment rules.

* * * * *